United States Patent
Persson et al.

[11] Patent Number: 6,053,990
[45] Date of Patent: Apr. 25, 2000

[54] PERLITIC GREY IRON FOR BRAKE COMPONENTS

[75] Inventors: Per-Eric Persson, Göteborg; Mats Fagergren, Kungälv; Bertil Sander, Nygård, all of Sweden

[73] Assignee: AB Volvo, Sweden

[21] Appl. No.: 08/793,658

[22] PCT Filed: Aug. 16, 1995

[86] PCT No.: PCT/SL95/00927

§ 371 Date: May 6, 1997

§ 102(e) Date: May 6, 1997

[87] PCT Pub. No.: WO96/07766

PCT Pub. Date: Mar. 14, 1996

[30] Foreign Application Priority Data

Sep. 9, 1994 [SE] Sweden .................................. 9402998

[51] Int. Cl.[7] .............................. C22C 37/10; F16D 65/12
[52] U.S. Cl. ............................... 148/321; 420/15; 420/26; 420/27
[58] Field of Search ............................... 148/321; 420/15, 420/26, 27

[56] References Cited

U.S. PATENT DOCUMENTS 4,948,437  8/1990  Metzler ................................... 148/612
4,961,791  10/1990  Metzler et al. ........................ 148/543
5,032,194  7/1991  Metzler ................................... 148/321

FOREIGN PATENT DOCUMENTS 2428821  12/1975  Germany .
60-036644  2/1985  Japan .
03271312  12/1991  Japan .
1432176  4/1976  United Kingdom .

OTHER PUBLICATIONS

Patent Abstracts of Japan, vol. 14, No. 377, C–748, abstract of JP, A, 2–138438 (Nissan Motor Co. Ltd.), May 28, 1990.

*Primary Examiner*—Sikyin Ip
*Attorney, Agent, or Firm*—Lerner, David, Littenberg, Krumholz & Mentlik, LLP

[57] ABSTRACT

An iron alloy material for brake components comprising substantially perlitic grey iron alloyed with further elements comprising: carbon present in an amount of 3.50–3.70% by weight; vanadium present in an amount of 0.05–0.1% by weight; molybdenum present in an amount of 0.20–0.30% by weight; silicon present in an amount of 1.90–2.0% by weight; manganese present in an amount of 0.55–0.70% by weight; phosphor present in a maximum amount of 0.10% by weight; sulphur present in an amount of 0.08–0.12% by weight; chromium present in an amount of 0.20–0.30% by weight; and copper present in an amount of 0.20–0.30% by weight.

8 Claims, 1 Drawing Sheet

PERLITIC GREY IRON FOR BRAKE COMPONENTS

FIELD OF THE INVENTION

The present invention relates to an iron alloy material comprising grey iron alloyed with further elements. In particular the invention relates to high-carbon-content grey iron components for braking systems which undergo wear during use, such as brake drums or brake discs for example.

BACKGROUND TO THE INVENTION

Due to the use of brake shoes and brake pads which are free of asbestos due to the health risks associated therewith, a significant problem has developed with regard to the useful life of the metallic components against which the shoes or pads bear. In heavy or high-speed vehicle applications where the thermal and normal stresses are high, this problem is accentuated. Whereas the previous asbestos brake materials for example would result in a brake drum life in a heavy vehicle of some $1 \times 10^6$ km, the new asbestos-free brake materials might reduce the life, in certain cases, down to as low as $3.4 \times 10^5$ km.

Further problems associated with brake drums and brake discs are brake squeal, brake judder and brake fade. Brake squeal is a noise which has a frequency of between about 600 Hz and 2000 Hz in drum brake applications and is particularly unpleasant for the vehicle driver as well as others in the audible area of the noise. This noise has been found not only to be related to the brake geometry but also to the materials of the brake drum/disc as well as the brake lining and has been found to be more intense with presently used friction lining materials.

Brake judder is a low frequency vibration of about 7 to 8 Hz and occurs due to the brake drum or brake disc being out of round, which is often an effect caused by built-in deformations from the process of wheel mounting and high temperature resultant thermal stress, which in the end may result in increased out-of-roundness in the brake component.

Brake temperature fade is a reduced braking effect caused, similar to brake judder, by increase in temperature. However, brake fade is due, in drum brakes for example, to the diameter of the drum increasing at a certain rate whilst the diameter of the shoe does not increase at a similar rate. The quality of the lining material also has an influence.

Several attempts have been made by others to overcome one or more of the above-mentioned problems. For example U.S. Pat. No. 4 948 437 and U.S. Pat. No. 4 961 791 disclose certain grey iron alloy compositions and specific subsequent heat treatments that have, as a combined process, been used to increase the tensile strength of the alloy, required after having raised the carbon content in the material to increase the conductivity and thereby reduce brake fade and judder. Clearly the use of a subsequent heat treatment adds to the cost and time of manufacture. Additionally the resultant alloy requires further improvement with respect to the aforementioned braking-associated problems.

A further array of possible alloy materials for disc brake applications is known from JP laid-open application no. 90-138438 which discloses a disc brake rotor made from an alloy developed to have high thermal resistance, high wear resistance and reduced brake squeal. Whilst the disc brake rotor according to that application may have certain advantages depending on the exact alloy composition chosen, the ranges given, such as for example the range of weight percentages for carbon (3.5 to 4.0%), for vanadium (0.02% to 0.35%), for copper (0.2 to 2%) and for molybdenum (0.4 to 1.2%), are very large indeed and cannot be said to give optimal results. Should any particular values inside these large ranges give an improved result, it is not stated what such restricted ranges or values might be. Indeed, the properties of the alloy obtained vary to a very large extent between the ends of the disclosed ranges.

The main object of the invention is thus to provide an alloy which is optimised for applications where the metal component is subject to wear by contact with a further component moving relative thereto.

In particular this object is directed to a brake drum or to a brake disc for automotive applications requiring optimised thermal resistance, squeal resistance and wear resistance having regard to the associated brake lining, with respect to which it is relatively movable (i.e. the relative movement being caused by the disc or drum rotation compared to the stationary friction linings of the pads or shoes). At the same time, the component must not be too hard since this would make machining more difficult, longer and thus more expensive.

A further object of the invention is to avoid the need for any subsequent heat treatment process.

SUMMARY OF THE INVENTION

The object of the invention is solved by an alloy which has the features defined in appended claim 1. Preferred features of the invention are defined in the dependent claims.

One aspect of the present invention comprises:

carbon present in an amount of 3.50–3.70% by weight;

vanadium present in an amount of 0.05–0.1% by weight;

molybdenum present in an amount of 0.20–0.30% by weight;

silicon present in an amount of 1.90–2.0% by weight;

manganese present in an amount of 0.55–0.70% by weight;

phosphor present in a maximum amount of 0.10% by weight;

sulphur present in an amount of 0.08–0.12% by weight;

chromium present in an amount of 0.20–0.30% by weight; and copper present in an amount of 0.20–0.30% by weight.

In a preferred embodiment of the invention a complete range of all values of elements of the alloy required for optimum performance has been defined.

BRIEF DESCRIPTION OF THE DRAWINGS

The invention will now be described with reference to a preferred embodiment thereof and with reference to the accompanying drawings in which.

DESCRIPTION OF PREFERRED EMBODIMENTS OF THE INVENTION

Figure 1:
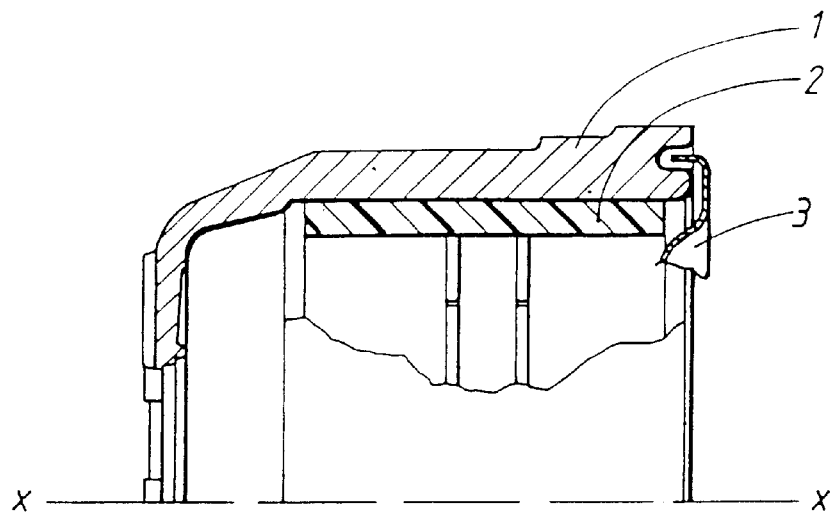
FIG. 1 shows a sectional view of a brake drum incorporating the alloy of the invention.

In the following description all percentages of the elements of the alloy are given in terms of weight. For example 4.0 to 4.2% means 4.0 to 4.2% by weight.

The alloy of the invention is basically a high-carbon-content grey iron alloy which has an equivalent carbon content of between 4.0 and 4.2%. The actual quantity of carbon has however been reduced to between 3.5 and 3.7% in the alloy of the invention.

The quantity of carbon added effects the E-modulus (modulus of elasticity) of the alloy such that the higher the amount of carbon is, the lower the E-modulus obtained. With a lowered E-modulus the effect is obtained that the high temperature mechanical properties of the material are increased. Additionally certain sound frequencies are damped. For example, a lowered E-modulus gives reduced force variations during braking for any given degree of out-of-roundness and thus the risk of brake judder can be reduced.

The heat conductivity of the iron is increased by the high content of carbon as is the heat capacity of the material, both of which are clearly desirable from a thermal fatigue point of view. This is the case since the increased heat conductivity gives a faster temperature dispersion in the rotational direction of the component which reduces thermal out-of-roundness effects and thus similarly reduces judder.

Furthermore carbon in graphite form will be present in the friction interface between the brake lining and the brake disc or drum which will assist heat dissipation directly due to the high heat conductivity of graphite which reduces the temperature gradient.

The graphite itself will mainly have the form of "graphite 1 A 3" as measured according to the ASTM standard norms.

The thermal resistance characteristics are also better in this material due to the fact that the low modulus of elasticity results in lower stresses for a given temperature change.

However the carbon must not be present in a higher amount since this would be detrimental to strength.

The matrix should be as close as possible to being 100% perlitic since small percentages of ferrite (e.g. of the order of 5%) would severely decrease wear resistance and the mechanical strength would be impaired. Since the brake component is clearly a prime safety item of a vehicle the obtaining of a near 100% perlitic structure is very important.

Vanadium is present in the alloy in an amount of 0.05–0.1%. As the amount of vanadium approaches 0.1% and above, the alloy becomes more expensive due to the vanadium content as well as being much harder and thus more expensive to machine (due to wear on the cutting tool(s)). However, if the amount is too low, wear resistance is reduced in the final alloy according to an adverse curvilinear relationship. Thus the amount of vanadium must be very carefully balanced to achieve the desired effect but without giving outweighing disadvantages. Consequently the amount of vanadium has been found to lie most suitably in a range of 0.07 to 0.08% to achieve the best balance of the required properties.

In order to achieve the expected results, molybdenum is present in an amount of 0.20–0.30% and the very best results are obtained in an amount of 0.25%. This element has the function of stabilising the perlite and thus increasing the mechanical strength of the alloy. At higher temperatures the molybdenum also serves to stabilise the pearlite and thus has the effect of increasing the thermal fatigue resistance characteristics.

If the amount of molybdenum is greater than 0.30% (e.g. about 0.40% or more) the material becomes very difficult to machine and the price per component thus becomes undesirably high.

In order to provide a complete solution for all the aforementioned problems, whilst providing an easily machinable component, the alloy also has certain additional elements as explained below.

In order that the carbon content should be equivalent to 4.0 to 4.2 (to obtain a eutectic precipitation of graphite and austenite respectively), phosphor and carbon are added. Silicon is added in an amount of between 1.9 to 2.1% such that a grey solidification is achieved. Additionally, silicon sets the ferrite and thus improves the mechanical strength of the matrix, although the amount of silicon should be restricted since this will reduce the heat conductivity of the alloy. However since the amount of phosphor should also be held as low as possible to avoid undesirable precipitations of phosphides, the addition of silicon in the prescribed amount is important to the end result.

Manganese is present in the alloy in an amount of between 0.55 and 0.70% and has the effect of stabilising the pearlite and thus improving mechanical strength.

Phosphor is present in a maximum amount of 0.1% and acts as a graphite stabiliser. However the content should be kept as low as possible in order to reduce the proportion of phosphide eutectic.

Sulphur should be present in an amount of between 0.08 to 0.12%.

Chromium is present in an amount of between 0.2 and 0.3% in order to increase the durability and wear resistance of the alloy, not only by stabilising the pearlite but also by building secondary carbides at the cell borders. These carbides are precipitated during solidification due to the fact that chromium segregates in the matrix. The amount of chromium which does not form carbides will have been dissolved in the pearlite's ferrite.

In order to avoid an undesirable amount of carbide the amount of chromium has to be "matched" with the amount of vanadium present in the alloy, since too high an amount will lead to the risk of primary carbide precipitation or to the precipitation of larger secondary carbides.

Copper is present since it is a large contributor to the formation of pearlite and is also a pearlite stabiliser (which increases mechanical strength). Copper also reduces the formation temperature in the solid phase when the pearlite is being formed, thus producing a finer structure which is important for hardness and breaking strength. Copper further serves to set the pearlite's ferrite and balances the chromium quantity whilst also opposing the formation of primary solidification carbides.

The remainder of the alloy material is constituted by the by grey iron and any other minor impurities.

Whilst the alloy can be produced to give the desired results within the narrow ranges or amounts defined above for the various elements, tests have been successfully carried out on brake drum prototypes using an alloy having a weight content of carbon of 3.65–3.70%, silicon of 2.0%, copper of 0.25%, chromium of 0.25%, molybdenum of 0.25% and vanadium of 0.07–0.08%, the remaining materials being as previously stated. Such an alloy used in a brake drum results in an alloy having a hardness of at least 170 according to the HB (5/750) test, i.e. a Brinell hardness using a 5 mm steel ball and 750 kg load.

Tests on a brake drum made from the alloy material of the invention as specified in the preceding paragraph have shown that the aforementioned precise combination of elements in the alloy produces significant improvements in all aspects simultaneously.

The method of manufacturing the components requires that the inoculation and casting temperature are adapted to the alloy. Thus the inoculation should be relatively high in order that primary carbides are avoided. Consequently, as an example, an amount of approximately 0.20% FeSi might be used as the inoculation additive. Similarly, the casting temperature should be lowered somewhat (suitably by some 20 to 30° C. compared with standard iron) in order to obtain a suitable over-temperature in the melt.

The smelting process is essentially the same as for most iron alloys and thus need not be described in great detail as this will be clear to the skilled man. The base molten iron component, containing silicon, manganese, phosphor and sulphur is produced in a cupola furnace after which it is transferred to a buffer oven. When the molten iron is in this form the additives are added to the melt in a transport ladle. The carbon is added in the form of graphite powder and the rest of the alloy additives are added in the form of FeCr, FeMo, and FeV. Inoculation material may be added at this stage and the silicon level may also be adjusted to give the correct equivalent carbon content. Copper is added in any suitable form of metal particles (e.g. filings) and a final adjustment of the required chemical composition is made in the casting oven prior to casting. Further inoculation material (e.g. FeSi) is then added to the stream of molten metal during passage from the casting oven to the mould.

After machining the casting to the exact dimensions of the drum or disc, no heat treatment is required.

FIG. 1 shows a sectional view of a preferred design of brake drum 1 of this invention for a heavy vehicle (e.g. a vehicle having four axles or eight axles with two or four wheels per axle for instance). The drum will be substantially symmetrical about centreline X—X and thus only one half of the drum is shown. Numeral 2 denotes the brake lining of a brake shoe which is applied to the inside of the drum to effect braking. Part of a dirt cover 3 is also shown in cross section.

The brake drum of such a heavy vehicle is particularly suitable for the application of the alloy of this invention since heavy vehicles of this type are normally required to do high mileage during their lifetime, whereas existing brake drums or discs may still be suitable for lighter automotive use (e.g. cars, vans or motorcycles) where the likely mileage is significantly lower. However the alloy of this invention may also find application in these vehicles as well.

Brake drums for modern large or heavy vehicles are quite deep and will have an inner diameter of 300 mm or more. Typically the inner diameter of the drums will be somewhere between 340 mm to 430 mm, with weight varying normally between about 35 kg and 85 kg. With the alloy of the invention however, since the wear resistance will be increased so significantly, the depth or the diameter of the drum (and thus also the pads or shoes) may be reduced whilst still obtaining sufficient wear life from the drum. This is clearly a significant advantage for the automotive industry and the end-user since not only is cost saved, but the weight (which is furthermore unsprung weight) is reduced along with all the ensuing advantages of better performance, reduced fuel consumption and better handling etc.

The alloy of the invention may also find application in cars or other smaller vehicles where the drum inner diameter or disc diameter is much smaller than in heavy vehicles.

Figure 2:
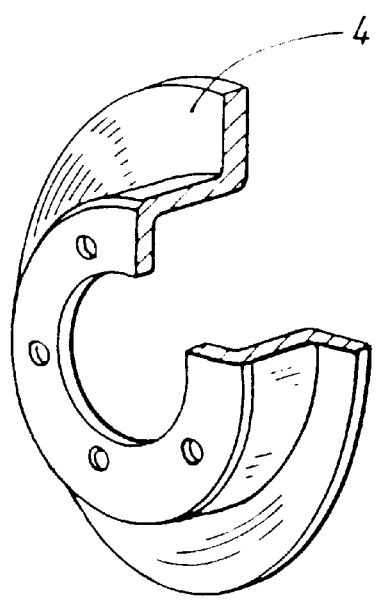
FIG. 2 shows a perspective view, in part section, of a brake disc incorporating the alloy of the invention.

FIG. 2 shows an example of a brake disc 4 which can be manufactured from the alloy of this invention. Similar reductions and savings to those described above with respect to drum brakes may also be made.

The exact form or type of brake drum or disc may of course vary widely from those depicted depending on the particular application.

By the use of the alloy according to the invention, no subsequent heat treatment of the machined drum or disc is required at all to achieve the desired results. Clearly this represents a significant cost and time reducing factor in comparison to many prior art solutions. However if for some other reason a subsequent heat treatment is applied, the improved braking properties of the material are maintained.

Using the alloy of this invention with present asbestos-free friction lining material (e.g. ABEX 929 or Mintexdon 7115 friction materials), the improvements in wear resistance obtained may be of the order of 200% or more which is a tremendously significant achievement. Even when the drum is used under extreme driving/braking conditions an increase of between 50 and 100% can be obtained. Even this increase is still a tremendous increase in drum life. Thus, it will be appreciated that by the careful study and intricate selection of the required alloy elements the inventors of the present alloy have arrived at an optimised brake body material which has distinct and significant mechanical and thermal advantages compared to the prior art materials used.

Tests have also shown that by using a drum or disc in accordance with the invention in combination with present day conventional brake pads or shoes, an increase in friction lining life of between 5 and 10% can also be obtained. This advantage may be used for example to increase service replacement intervals and thus generally lower cost.

The invention is not restricted to the embodiments described above but may be varied widely within the scope of the appended claims. For example, whilst the alloy has been described with respect to rotating brake components for which it has been specifically designed, the alloy may also be used in other fields, for example clutches of differing types or other applications where frictional contact between the alloy and a further lining surface occurs.

We claim:

1. An iron alloy material comprising:

carbon present in an amount of 3.50–3.70% by weight;

vanadium present in an amount of 0.05–0.1% by weight;

molybdenum present in an amount of 0.20–0.30% by weight;

silicon present in an amount of 1.90–2.0% by weight;

manganese present in an amount of 0.55–0.70% by weight;

phosphor present in a maximum amount of 0.10% by weight;

sulphur present in an amount of 0.08–0.12% by weight;

chromium present in an amount of 0.20–0.30% by weight; and copper present in an amount of 0.20–0.30% by weight;

with the balance being substantially perlitic grey iron.

2. The iron alloy material as claimed in claim 1 wherein said vanadium is present in an amount of 0.07–0.08% by weight.

3. The iron alloy material as claimed in claim 2 wherein said carbon is present in an amount of 3.65 to 3.7% by weight, said copper is present in an amount of 0.25% by weight, said chromium is present in an amount of 0.25% by weight, said molybdenum is present in an amount of 0.25% by weight, and said silicon is present in an amount of 2.0% be weight.

4. The iron alloy material as claimed in claim 1 wherein said vanadium is present in an amount of 0.075% by weight and said molybdenum is present in an amount of 0.25% by weight.

5. A brake drum manufactured from an alloy material according to claim 1.

6. The brake drum as claimed in claim 5 wherein said brake drum is an automotive brake drum.

7. The brake drum as claimed in claim 5 wherein said brake drum has a diameter equal to or greater than 300 mm.

8. A brake disc manufactured from the alloy material according to claim 1.

* * * * *

UNITED STATES PATENT AND TRADEMARK OFFICE
CERTIFICATE OF CORRECTION

PATENT NO. : 6,053,990
DATED : April 25, 2000
INVENTOR(S) : Persson et al.

It is certified that error appears in the above-identified patent and that said Letters Patent is hereby corrected as shown below:

Title page,
Item [86] should read - PCT/SE95/00927

Column 3,
Line 55, "perlite" should read -- pearlite --.

Column 4,
Line 43, delete "by".

Column 6,
Line 28, "comprising" should read -- consisting essentially of --.
Line 54, "be" should read -- by --.

Signed and Sealed this

Seventh Day of August, 2001

*Attest:*

NICHOLAS P. GODICI
*Attesting Officer*  Acting Director of the United States Patent and Trademark Office